(12) United States Patent
Ishiodori et al.

(10) Patent No.: US 7,909,178 B2
(45) Date of Patent: Mar. 22, 2011

(54) POROUS MEMBRANE OF VINYLIDENE FLUORIDE RESIN AND PROCESS FOR PRODUCING THE SAME

(75) Inventors: Arata Ishiodori, Kurashiki (JP); Kensaku Komatsu, Kurashiki (JP); Koji Yamada, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 12/367,919

(22) Filed: Feb. 9, 2009

(65) Prior Publication Data

US 2009/0148659 A1    Jun. 11, 2009

Related U.S. Application Data

(63) Continuation of application No. PCT/JP2007/000862, filed on Aug. 9, 2007.

(30) Foreign Application Priority Data

Aug. 10, 2006   (JP) ................... 2006-218396
Aug. 10, 2006   (JP) ................... 2006-218397
Aug. 10, 2006   (JP) ................... 2006-218398

(51) Int. Cl.
*B01D 33/21*    (2006.01)
*B01D 39/00*    (2006.01)
*B01D 39/14*    (2006.01)
*B29C 65/00*    (2006.01)
*B29C 67/00*    (2006.01)
*B32B 27/00*    (2006.01)

(52) U.S. Cl. ......... 210/500.23; 210/500.27; 210/500.36; 210/500.42; 264/41; 264/49; 264/177.14

(58) Field of Classification Search ............. 210/500.27, 210/500.23, 500.36, 500.42; 264/41, 49, 264/177.14
See application file for complete search history.

(56) References Cited

U.S. PATENT DOCUMENTS 4,696,748 A    9/1987   Nitadori et al.
(Continued)

FOREIGN PATENT DOCUMENTS

| EP | 1 010 457 A1 | 6/2000 |
| EP | 1 063 256 A1 | 12/2000 |
| JP | 61-093805 | 5/1986 |

(Continued)

OTHER PUBLICATIONS

Hideto Matsuyama "Preparation of Porous Polymer Membrane with Thermally Induced Phase Separation (TIPS) Method" of Chemical Engineering, Published by Kagaku Kogyosha, Jun. 1, 1998.

*Primary Examiner* — Ana M Fortuna (74) *Attorney, Agent, or Firm* — Oblon, Spivak, McClelland, Maier & Neustadt, L.L.P.

(57) ABSTRACT

A porous membrane, made of polyvinylidene fluoride which is excellent in fractionating capability, permeating capability and physical strength and suitable for use in water treatment such as water purification, preparation of drinking water, preparation of water for industrial use and wastewater treatment, and which can be manufactured inexpensively and easily. The porous membrane has one surface formed with round or oval micropores and the opposite surface formed with substantially slit shaped micropores. The round or oval micropores have an average ratio between the major axis and the minor axis, which is within the range of 1:1 to 5:1, and the substantially slit shaped micropores have an average ratio between the major axis and the minor axis, which is not smaller than 5:1 and the particle cutoff of the membrane is not smaller than 0.2 μm.

15 Claims, 3 Drawing Sheets

U.S. PATENT DOCUMENTS

| | | | |
|---|---|---|---|
| 5,294,338 A | | 3/1994 | Kamo et al. |
| 5,698,101 A | * | 12/1997 | Kopp et al. .............. 210/500.23 |
| 5,976,433 A | * | 11/1999 | Komatsu et al. ................ 264/41 |
| 6,110,369 A | * | 8/2000 | Ditter et al. .............. 210/500.41 |
| 6,277,281 B1 | * | 8/2001 | Ditter et al. .................. 210/645 |
| 6,409,921 B1 | * | 6/2002 | Muller et al. ................. 210/644 |
| 6,596,167 B2 | * | 7/2003 | Ji et al. .................... 210/500.42 |
| 6,890,436 B2 | * | 5/2005 | Komatsu et al. ......... 210/500.41 |
| 7,258,914 B2 | * | 8/2007 | Morikawa et al. ......... 428/316.6 |
| 2002/0011443 A1 | * | 1/2002 | Komatsu et al. ................ 210/650 |
| 2003/0107150 A1 | | 6/2003 | Hamanaka et al. |
| 2003/0232184 A1 | * | 12/2003 | Morikawa et al. ......... 428/316.6 |
| 2006/0014912 A1 | | 1/2006 | Araki et al. |
| 2006/0032813 A1 | | 2/2006 | Ieraci et al. |

FOREIGN PATENT DOCUMENTS

| | | | |
|---|---|---|---|
| JP | 05-049878 | | 3/1993 |
| JP | 09-328566 | | 12/1997 |
| JP | 11-086830 | | 3/1999 |
| JP | 11-104235 | | 4/1999 |
| JP | 11-319522 | | 11/1999 |
| JP | 2000-057846 | | 2/2000 |
| JP | 2003-138422 | | 5/2003 |
| JP | 2003-210954 | | 7/2003 |
| JP | 2005-194461 | | 7/2005 |
| JP | 2005-194461 A | * | 7/2005 |
| JP | 2005-200623 | | 7/2005 |
| WO | WO 98/38029 | | 9/1998 |
| WO | WO 02/070115 A1 | | 9/2002 |

* cited by examiner

POROUS MEMBRANE OF VINYLIDENE FLUORIDE RESIN AND PROCESS FOR PRODUCING THE SAME

BACKGROUND OF THE INVENTION

1. Field of the Invention

The present invention relates to a porous membrane made of a vinylidene fluoride resin, which is excellent in fractionating capability, permeating capability and is suitable for use in the field of water treatment such as, for example, water purification, preparation of drinking water, preparation of water for industrial use, wastewater treatment, food engineering, charged membranes and fuel cells and also to a method of making such porous membrane which is excellent in aspects of production controllability, cost and pore forming characteristics.

2. Description of the Prior Art

In recent years, the technology of separating means utilizing a porous membrane having a selective permeability has been remarkably developed. Such a separating technology is utilized in practice as a series of purifying systems, including separating process, cleansing process and sterilizing process, in the field of, for example, manufacture of drinking water, ultra-pure water and medicines and microorganism elimination and finishing of brewed products. In those fields of application, fining (a high level processing) of water and increase of safety and increase of precision are required at a high level and the use of porous membranes is being widely spread. In view of those situations, required characteristics of the porous membrane have come to be sophisticated. Of those membrane characteristics, the permeating capability and the fractionating capability are considered particularly important. As far as the permeating capability and the fractionating capability are concerned, they must be balanced relative to each other so that particles as small as possible can be removed at a high rate of pure water permeate flow and, in order to achieve this, the continuity of pores and the membrane surface structure are important.

In the water purifying treatment, for the purpose of sterilization of permeate and prevention of bio-fouling in the membrane, a disinfectant such as, for example, sodium hypochlorite is added to a membrane module portion and/or the membrane itself is rinsed with acid, alkali, chlorine or surface active agent, and, accordingly, the porous membrane is also required to have a chemical resistance. In the preparation of tap water, since pathogenic organisms tolerant to chlorine such as, for example, cryptosporidium originating from livestock excrement and urine cannot be sufficiently removed in the water filtration plant and, hence, troubles associated with admixture of pathogenic organisms in the treated water have come to be elicited since 1990, the demands have arisen that the porous membrane must have a sufficient separating or screening characteristic effective to prevent an admixture of raw water into the treated water and, also, a high physical strength enough to avoid thread breakage.

As discussed above, some important characteristics required for the porous membrane to have includes the separating or screening precision, permeating performance, physical strength and chemical strength (chemical resistance). Accordingly, development of a porous membrane with the utilization of polyvinylidene fluoride has recently come to be advanced. The porous membrane utilizing the vinylidene fluoride resin is excellent not only in strength, elongation and chemical resistance, but also in resistance to oxidant and can, therefore, be utilized in a high level water treatment using ozone that has recently gained public interest.

As hereinabove discussed, the physical strength of the porous membrane and the chemical strength thereof represented by the chemical resistance are mostly attributable to the characteristics of material used to form the porous membrane, but the permeating and fractionating performances of the porous membrane depends on the method of preparing such porous membrane.

As a method of making a hollow fiber membrane capable of realizing a high rate of pure water permeate flow, a stretch opening method may be enumerated. This method is characterized in that material for the membrane is annealed and stretched under a specific condition and, as a result, a hollow fiber membrane having a multiplicity of slit shaped micropores formed therein having been bounded by microfibrils and nodes defined by stacked lamellae can be manufactured. (See, for example, the Patent Document 1 quoted below.) However, the hollow fiber membrane so manufactured according to the method referred to above involves such a problem that since as a result of stretching fibers are oriented in a direction of fibers, the strength in a circumferential direction tends to be reduced considerably. In particular, since the strength tends to be reduced as the pore size increases, and, therefore, it is difficult to manufacture with the method referred to above, the hollow fiber membrane having a practically acceptable strength. Also, since although the pure water transmission rate is high, the pore size is largely distributed and the pores so formed represents a slit-like shape, there is a problem that substances of an elongated shape tends to be easily transmitted, resulting in reduction in separating or screening precision.

As a method of manufacturing a separating membrane excellent in permeating and fractionating performances, the case in which phase separation is utilized is largely well known. The membrane manufacturing method utilizing such a phase separation can be generally classified into a non-solvent induced phase separation process and a thermal induced phase separation process.

In the non-solvent induced phase separation process, a uniform polymer solution containing a polymer and a solvent mixed together brings about a phase separation as a result of change in concentration induced by ingress of a non-solvent and evaporation of a solvent to external atmosphere. As a method of manufacturing a separating membrane with the use of such a non-solvent induced phase separation process, the method is known, in which after a polysulfone resin is dissolved in a solvent such as, for example, N,N-dimethyl acetamide or the like, non-solvent induced phase separation is initiated within a coagulation bath to thereby form the separating membrane. (See, for example, the Patent Document 2 quoted below.) However, the non-solvent induced phase separation process generally has such problems associated with the physical properties of the membrane, the process controllability and the cost because it is difficult to control the phase separation within the non-solvent, the cost of manufacture is high because of the necessity of use of the non-solvent, and macrovoids tend to occur.

On the other hand, the thermal induced phase separation process generally includes the following steps.

(1) A mixture of a polymer and a solvent having a high boiling point is melted at high temperature;

(2) Cooling is carried out at a proper rate in order to induce the phase separation to thereby solidify the polymer; and (3) The solvent used is extracted.

Advantages of the thermal induced phase separation process as compared with the non-solvent induced phase separation process are as follows:

(a) Formation of macrovoid, which constitute a cause of reduction in strength of the membrane, can be prevented. (b) With the non-solvent induced phase separation process, the use of a non-solvent other than a solvent is needed and, therefore, a control is difficult to achieve during the manufacture accompanied by reduction in reproducibility. On the other hand, with the thermal induced phase separation process, the use of the non-solvent is not needed and, therefore, the process controllability and the cost characteristic are excellent, accompanied by a high reproducibility. (c) Control of the pore size can be relatively easy to achieve and distribution of the pore size is so sharp as to bring about an excellent pore forming characteristic.

The thermal induced phase separation includes a solid-liquid type thermal induced phase separation and a liquid-liquid type thermal induced phase separation and which one of them develops depends on the compatibility between the polymer and the solvent. Where the compatibility between the polymer and the solvent is very high, the solid-liquid type thermal induced phase separation will develop, but when such compatibility is lowered, the liquid-liquid type thermal induced phase separation develops and the both will eventually become incompatible with each other. In general, since in the liquid-liquid type thermal induced phase separation proceed, the phase separation proceeds as a result of the spinodal decomposition, the liquid-liquid type head induced phase separation has such a feature that the co-continuous structure tends to develop easily as compared with the solid-liquid thermal induced phase separation and, as a result, it is possible to manufacture the separation membrane excellent in excellent pore forming characteristics such as, for example, pore continuity and uniformity. In other words, in order to manufacture the separation membrane excellent in permeating performance and fractionating performance, it is desirable to select a proper combination of a polymer and a solvent that leads to development of the liquid-liquid type thermal induced phase separation. However, since the region in which the polymer and the solvent lead to development of the liquid-liquid type thermal induced phase separation is limited, selection of a proper combination of the polymer with the solvent is known to be important where the separation membrane is desired to be manufactured with such method referred to above. (See, for example, the Non-patent Document 1 quoted below.)

The method of making the porous membrane made of a vinylidene fluoride resin, which utilizes the liquid-liquid type thermal induced phase separation process is well known in the art. (See, for example, the Patent Document 3 quoted below.) However, the porous membrane so manufactured with such process is equal to or higher than 30000 L/m$^2$/hr/98 kPa and a fractionated particle size not smaller than 1 μm, a series of examinations made by the inventor of the present invention has revealed that such porous membrane contain a number of pores that are not communicated with each other, that is, closed pores and, yet, the pores of the substantially same size appear on opposite surfaces of the membrane and, therefore, such porous membrane is incapable of exhibiting a high rate of pure water transmission relative to the fractionated particle size.

Also, since the vinylidene fluoride resin is hydrophobic, water will not permeate through the membrane of polyvinylidene fluoride unless it is treated otherwise, and, therefore, a hydrophilizing treatment is required in order for a hydrophilic liquid including water to penetrate through the membrane.

The following literature is available as patent documents believed to be relevant to the present invention.

Patent Document 1: JP Laid-open Patent Publication No. H05-49878, published Mar. 2, 1993.
Patent Document 2: JP Laid-open Patent Publication No. H11-104235, published Apr. 20, 1999.
Patent Document 3: JP Laid-open Patent Publication No. 2005-194461, published Jul. 21, 2005.
Patent Document 4: JP Laid-open Patent Publication No. 2003-138422, published May 14, 2003.
Patent Document 5: JP Laid-open Patent Publication No. 2005-200623, published Jul. 28, 2005.
Non-patent Document 1: "Chemical Engineering" published by Kagaku Kogyosha, the issue of June, 1998, pp. 453 to 464.

SUMMARY OF THE INVENTION

The present invention has therefore been developed in view of the foregoing problems and inconveniences inherent in the prior art and is intended to provide inexpensively and readily, a porous membrane which is excellent in permeating capability, fractionating capability, physical strength and chemical strength and is suitable for use in the field of water treatment such as, for example, water purification, preparation of drinking water, preparation of water for industrial use and wastewater treatment and which is also excellent in aspects of production controllability, cost and pore forming characteristics.

In order to alleviate the foregoing problems and inconveniences, the present invention provides a porous membrane made of a vinylidene fluoride resin and having a particle cutoff not smaller than 0.2 μm, which membrane has first and second surfaces opposite to each other, the first surface having round or oval micropores of a size, of which the average ratio between the major axis and the minor axis is within the range of 1:1 to 5:1; whereas the second surface has substantially slit shaped micropores, of which the average ratio between the major axis and the minor axis is not smaller than 5:1. At this time, the porous membrane is preferably made of a blended polymer containing the vinylidene fluoride resin in a quantity of 90 to 99 wt % and a hydrophilic resin in a quantity of 1 to 10 wt %. Also, the hydrophilic resin referred to above is preferably a vinylpyrrolidone resin, and the porous membrane is preferably in the form of a hollow fiber membrane.

The inventors of the present invention focused attention on and intensively examined the compatibility of the various components forming a stock solution used to manufacture the porous membrane and, as a result, have found that even where a combination of a vinylidene fluoride resin and a solvent is of a type capable of developing the solid-liquid type thermal induced phase separation, a membrane having characteristics comparable with or better than those of the porous membrane obtained the combination is of a type capable of the liquid-liquid type thermal induced phase separation, provided that a solvent, inorganic particles and an aggregating agent are properly combined.

The present invention aims at manufacturing the porous membrane of a vinylidene fluoride resin having the above described characteristics, which makes use of a porous membrane making stock solution containing a vinylidene fluoride resin, a solvent, inorganic particles and an aggregating agent, in which the inorganic particles and the aggregating agent has an affinity to each other and the solvent and the aggregating agent are insoluble relative each other or have an upper critical solution temperature, and which includes a step of solidifying after a phase separation has been induced by cooling, a step of stretching the porous membrane before the solvent, the inorganic particles and the aggregating agent are extracted completely.

According to the present invention, it is possible to industrially steadily and inexpensively manufacture the porous membrane excellent in fractionating capability, permeating capability and physical strength. The use of the porous membrane of the present invention makes it possible to achieve filtration at a high pure water transmission rate and with a high fractionating performance, thus reducing the cost of fresh water generation.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

The porous membrane of a vinylidene fluoride resin according to the present invention includes first and second surfaces opposite to each other in which the first surface has micropores of a round or oval shape of average ratio, between the major axis and the minor axis, is within the range of 1:1 to 5:1; and the second surface has micropores of substantially slit shape of average ratio between the major axis and the minor axis not smaller than 5:1. The porous membrane has a particle cutoff not smaller than 0.2 μm.

The porous membrane of the present invention has a high fractionating capability since the first surface having the micropores of a round or oval shape, of which the average ratio between the major axis and the minor axis is within the range of 1:1 to 5:1, con-tributes as an active spot decisive of whether or not particulates are to be passed therethrough. Also, the porous membrane of the present invention has a high rate of pure water transmission because the second surface having the slit shaped micropores formed by a structure containing microfibrils of a kind, of which the average ratio between the major axis and the minor axis is not smaller than 5:1, has a high rate of hole area. The porous membrane of the present invention having such features has a high permeating capability relative to the fractionated particle size. Accordingly, it is possible to manufacture the membrane having a high permeating capability and having a particle cutoff not smaller than 1 μm. Also, since increase of the pore size allows a gaseous medium such as, for example, air to be permeated under a pressure equal to or lower than 100 kPa even in a wet condition, rinsing is possible with a physical means such as, for example, gas backwashing.

Figure 1:
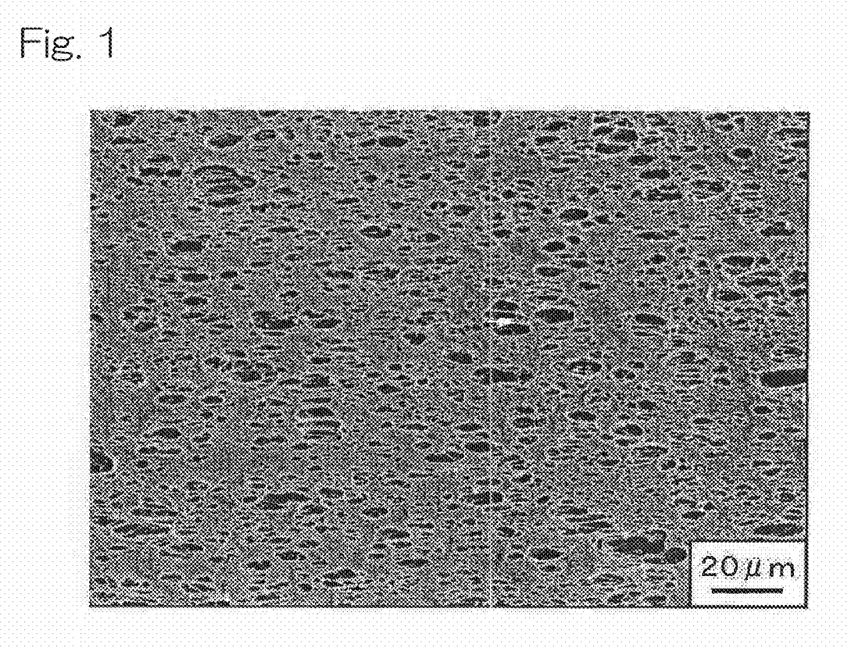
FIG. 1 is a scanning electron micrograph showing an outer surface of a porous membrane of a vinylidene fluoride resin manufactured in accordance with a method in Example 3.
Figure 2:
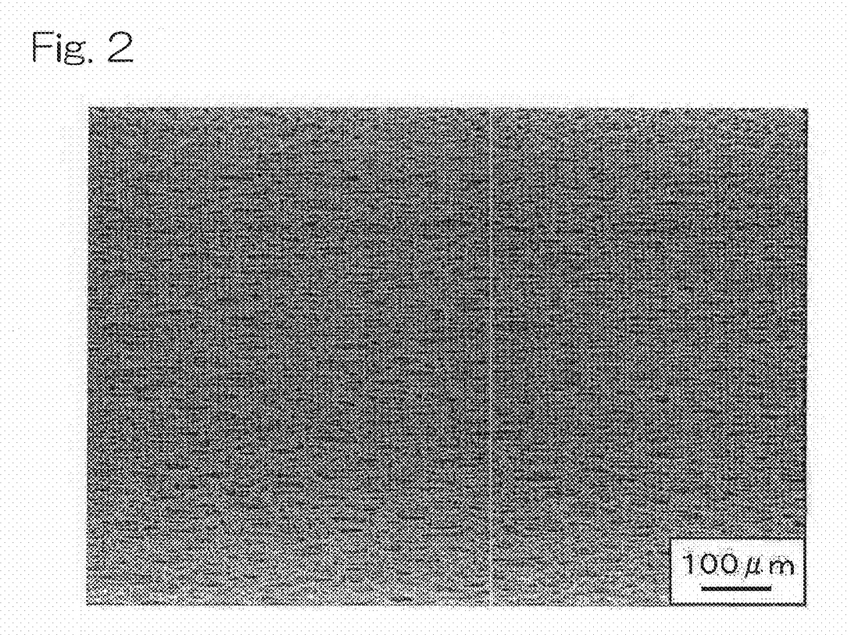
FIG. 2 is a scanning electron micrograph showing an inner surface of a porous membrane of a vinylidene fluoride resin manufactured in accordance with a method in Example 3.
Figure 3:
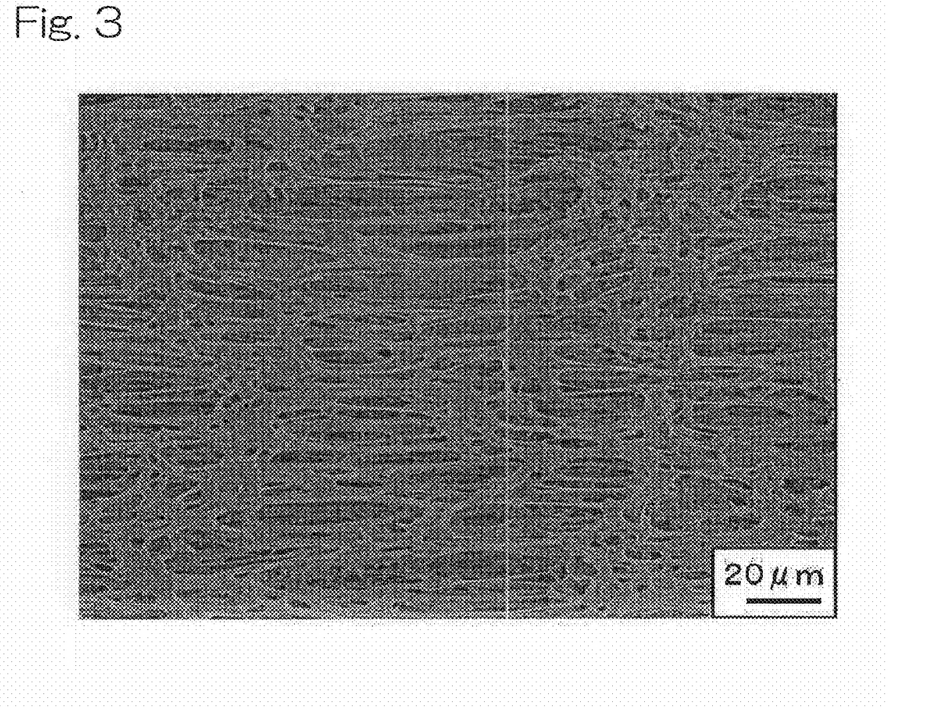
FIG. 3 is a scanning electron micrograph showing an inner surface of a porous membrane of a vinylidene fluoride resin manufactured in accordance with a method in Example 3.
Figure 4:
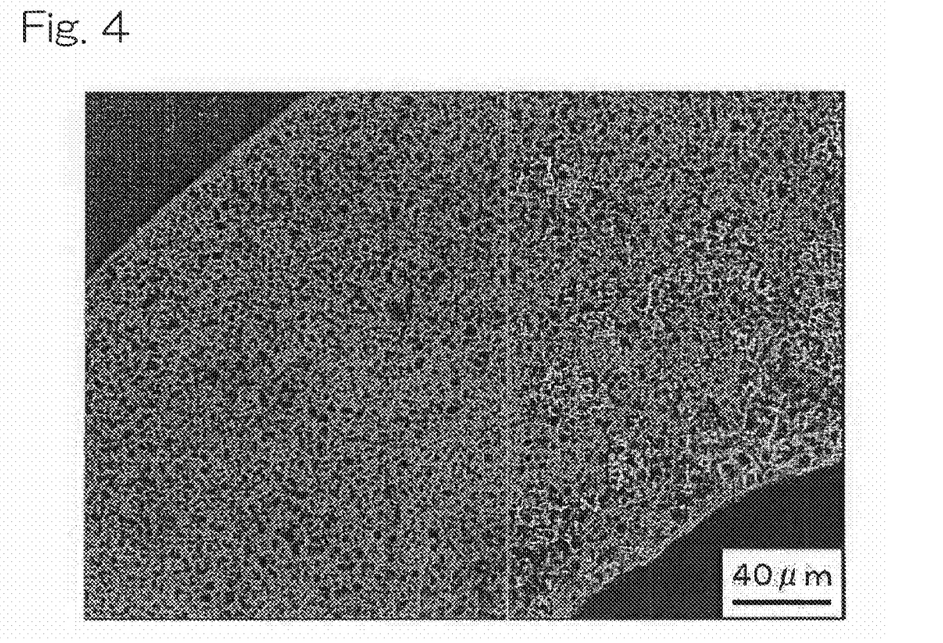
FIG. 4 is a scanning electron micrograph showing a cross-section of a porous membrane of a vinylidene fluoride resin manufactured in accordance with a method in Example 3.

The round or oval micropores of a type, of which the average ratio between the major axis and the minor axis is within the range of 1:1 to 5:1, as referred to hereinabove, stand for micropores, in which an average of values measured by taking photomicrographs of at least two local areas of the first surface with the use of an electron microscope (at a magnification of, for example, ×1000) as shown in the micrograph of the first surface in FIG. 1, measuring ratios between major axes and minor axes of all micropores viewable within the field of view of the photomicrographs, and repeating the foregoing procedures until the number of the micropores measured exceeds 30, is within the range of 1:1 to 5:1.

Also, the slit shaped micropores of a type, of which the average ratio between the major axis and the minor axis is not smaller than 5:1, as referred to hereinabove, stand for micropores, in which an average of values measured by taking photomicrographs of at least two local areas of the second surface with the use of an electron microscope (at a magnification of, for example, ×500) as shown in the micrographs of the second surface in FIGS. 1 to 5, measuring ratios between major axes and minor axes of micropores, formed by microfibrils oriented in a direction of fibers and viewable within the field of view of the photomicrographs and repeating the foregoing procedures until the number of the micropores measured exceeds 30, is not smaller than 5:1.

The cross section structure of the membrane is preferably of a three-dimensional network structure having a pore size greater than that of the first surface having the round or oval micropores, but may have a symmetrical structure, an asymmetrical structure, or a finger-like structure or voids. Also, the void ratio, which is a volume ratio of space within the porous membrane, is within the range of 50 to 95% and, preferably, within the range of 70 to 90%. If the void ratio is equal to or smaller than 50%, it is difficult to secure a sufficient pure water transmission rate, but if it exceeds 90%, the strength of the membrane will lower and breakage and fracture occurs during enforcement of membrane filtration and, therefore, the membrane lacks durability.

Arrangement of the surface having the round or oval micropores, of which the average ratio between the major axis and the minor axis is within the range of 1:1 to 5:1, and the surface having the slit shaped micropores, of which the average ratio between the major axis and the minor axis is not smaller than 5:1, such as one above the other or inside and outside, may be changed depending on the filtering system. However, since the surface having the round or oval micropores is responsible for the separating function and the cross section structure is responsible for the physical strength, the surface having the round or oval micropores is preferably arranged on the side facing an object to be separated. In particular, in order to suppress a reduction in permeating performance resulting from deposition of contaminant substances, the surface having the round or oval micropores, which is responsible for the separating function, is preferably disposed on the outermost layer.

The porous membrane of the present invention may be employed in the form of a hollow fiber membrane or a flat membrane. However, the hollow fiber membrane is preferably employed since the hollow fiber membrane can be efficiently packed, whereby an increased effective membrane surface area per unitary volume can be obtained.

The vinylidene fluoride resin employed in the practice of the present invention is a resin containing a vinylidene fluoride homopolymer and/or a vinylidene fluoride copolymer. The vinylidene fluoride resin may contain a plurality of kinds of vinylidene fluoride copolymers. For the vinylidene fluoride copolymers, copolymers of vinylidene and at least one chemical, selected from the group consisting of vinyl fluoride, tetrafluoroethylene, hexafluoropropylene and chlorotrifluoroethylene may be enumerated. Also, the weight average molecular weight of the vinylidene fluoride resin may be suitably selected in consideration of the strength and the permeating performance of the porous membrane required, but where the weight average molecular weight increases, the membrane forming characteristic will decrease and where the weight average molecular weight decreases, the strength will decrease. For this reason, the weight average molecular weight is preferably within the range of 50000 to 1000000. In the case of the field of water treatment, in which the porous membrane is subjected to chemical cleansing, the weight average molecular weight is preferably within the range of 100000 to 700000 and more preferably within the range of 150000 to 600000.

The hydrophilizing treatment that may be employed in the practice of the present invention may be any type well known to those skilled in the art. (See, for example, the Patent Document 4 quoted above.)

The hydrophilic resin employed in the practice of the present invention is a resin having an extremely strong affinity with water and includes a polyvinyl pyrrolidone resin, polyvinyl alcohol, a saponified substance of ethylene-polyvinyl acetate copolymer, polyethylene glycol, polyglycolic monoester, a copolymer of polyethylene glycol and polypropylene glycol, polyacrylic acid, polymethacrylic acid, polystyrene sulfonate, cellulose derivatives and polysorbate. Of them, the use of the polyvinyl pyrrolidone resin is preferred.

The polyvinyl pyrrolidone resin that may be employed in the practice of the present invention is a polyvinyl pyrrolidone homopolymer or a copolymer of polyvinyl pyrrolidone and any other copolymerizable vinyl monomer. Of them, the polyvinyl pyrrolidone homopolymer is preferred.

The weight average molecular weight of those resins is not specifically limited to a particular value. It may be suitably selected in consideration of the strength and the permeating performance of the membrane required, but in terms of the processability to form the porous membrane, it is preferably within the range of 5000 to 2000000. Also, of the vinyl pyrrolidone resins, a water soluble resin such as, for example, polyvinyl pyrrolidone has a high possibility of being slowly dissolved when used in a water system. Where ingress of the water soluble resin so dissolved into the side of a processing liquid may form a problem, it is preferred for the water soluble resin to be insolubilized. The treatment to insolubilize polyvinyl pyrrolidone includes a cross-linking of polyvinyl pyrrolidone with the use of gamma rays, a cross-linking with the use of ultraviolet rays or a chemical cross-linking in which a heat treatment is carried out in the presence of strong alkali or persulfate. Of them, the chemical cross-linking utilizing persulfate is preferred to achieve the insolubilization.

The solvent that may be employed in the practice of the present invention is employed of a kind that cart induce the thermal induced phase separation. While the type of the thermal induced phase separation includes a solid-liquid phase separation and a liquid-liquid phase separation, either of them may be employed in the practice of the present invention. For the solvent which can assume the solid-liquid phase separation with polyvinylidene fluoride, acetophenone, isophorone, cyclohexanone, dimethyl phthalate, diethyl phthalate, γ-butyrolactone and ε-caprolactone may be enumerated. For the solvent which can assume the solid-liquid phase separation with a polyvinylidene fluoride-propylene hexafluoride copolymer, acetophenone, dibutyl sebacate and tricresyl phosphate may be enumerated. Also, for the solvent which can assume the liquid-liquid phase separation with polyvinylidene fluoride, hexyl benzoate may be enumerated and for the solvent which can assume the liquid-liquid phase separation with the polyvinylidene fluoride-propylene hexafluoride copolymer, propyl salicylate and pyridine may be enumerated. Of them, the use of a water soluble solvent such as, for example, γ-butyrolactone or ε-caprolactone is preferred in the practice of the present invention. Where the water soluble solvent is used, water may be employed to extract the solvent from the porous membrane after the membrane has been manufactured, and the extracted solvent can be disposed by a biological treatment. On the other hand, where the solvent insoluble with water is employed, the use of an organic solvent such as, for example, acetone is necessary to extract the solvent from the porous membrane after the membrane has been manufactured, and, therefore, depending on the properties of the solvent used, an explosion-proof facility would be required. In view of the foregoing reasons, the use of the water soluble solvent is preferred on an industrial scale in terms of aspects of safety, equipments and cost.

The inorganic particles that may be employed in the practice of the present invention are utilized as the micropores in the porous membrane and are preferably of a kind that can be easily extracted with chemicals and have a relatively narrow distribution in particle size. Examples of the inorganic particles include those of silica, calcium silicate, aluminum silicate, magnesium silicate, calcium carbonate, magnesium carbonate, calcium phosphate, hydroxide or metal oxide of, example, iron and zinc and salts such as, for example, sodium, kalium and calcium. In particular, the inorganic particles having an aggregative, when added to the composition of a kind, in which the vinylidene fluoride resin and the solvent usually separate in phase from each other, gain an increased stability in a condition, in which the vinylidene fluoride resin and the solvent are compatibilized with each other, making it possible to manufacture the uniformly porous membrane and are therefore suitably employed in the manufacture of the porous membrane having a further increased pore size. Because of such aggregative property, silica is suitably employed for the inorganic particles. The particle size of the inorganic particles (which is represented by the aggregated particle size in the case of the inorganic particles having the aggregative property) may be suitably selected in consideration of the pore size of the porous membrane desired, In the case of the ultrafiltration membrane, the inorganic particles having the particle size not greater than 0.01 μm are selected; in the case of the microfiltration of which the particle cutoff is not greater than 1 μm, the inorganic particles having the particle size within the range of 0.01 to 1 μm are selected; and in the case of the macroporous membrane of which the particle cutoff greater than 1 μm, the inorganic particle having the aggregated particle size greater than 1 μm are selected. Also, for the purpose of the particle size control of the porous membrane, particularly that of increasing the communication of the pores thereof, the inorganic particles having different aggregated particle sizes may be mixed together. With respect to the high permeating performance which is one of features manifested by the porous membrane of the present invention, the greater the particle cutoff of the porous membrane of the present invention, the higher the magnitude of the effect as compared with that of the conventional art. In this respect, the particle cutoff of the porous membrane of the present invention is not smaller than 0.2 µm, preferably within the range of 1 to 1.5 µm and more preferably 2.0 µm.

The aggregating agent that may be employed in the practice of the present invention is a composition having such characteristics that (1) it has an affinity to the inorganic particles, preferably enough to increase the aggregative of the inorganic particles, and (2) it is incompatible with the solvent or has an upper critical solution temperature. Additionally, the aggregating agent is preferably in the form of the composition having the characteristics (3) to (5) discussed below. (3) It is incompatible with the vinylidene fluoride resin, (4) it has a boiling point higher than the temperature at which the vinylidene fluoride resin and the solvent dissolve together, and (5) it has a hydrophilic group. Examples of the aggregating agent having the characteristics (1) and (3) to (5) discussed above include polyhydric alcohols such as, for example, ethylene glycol, propylene glycol, triethylene glycol, polyethylene glycol and glycerin; polyglycerin fatty acid esters such as, for example, decaglyceryl monolaurate; polyoxymethylene glycerin fatty acid esters such as, for example, polyoxyethylene glycerin monostearate; polyoxyethylene alkyl ethers such as, for example, polyoxyethylene lauryl ether and polyoxyethylene cetyl ether; polyoxyethylene polyoxypropylene alkyl ethers such as, for example, polyoxyethylene polyoxypropylene cetyl ether; polyoxyethylene alkylphenyl ethers such as, for example, polyoxyethylene nonyl phenyl ether; and polyoxyethylene sorbitan fatty acid esters such as, for example, polyoxyethylene sorbitan monopalmitate. Of them, the aggregating agent having the characteristic (2) discussed above is preferably selected.

The upper critical solution temperature referred to in the characteristic (2) discussed above means an upper limit temperature at which the phase separation takes place in the case of a combination in which the compatibility of the solvent and the aggregating agent changes with temperature. The term "compatible (or compatibility)" hereinabove and hereinafter used is intended to mean that the solvent and the aggregating agent can be mixed together. The upper critical solution temperature referred to herein is measured in the following manner. Specifically, a dispersion liquid containing the solvent and the aggregating agent, both of which had been check-weighed so as to attain a predetermined weight fraction, was filled into a sample tube and was then heated within a high temperature controlled bath filled with silicone oil to prepare a solution. The heating temperature was set to a predetermined temperature, which is 10° C. lower than lowest one of the respective boiling points of the solvent and the aggregating agent. After the solution had been retained for five minutes at the heating temperature, the inside of the sample tube was observed with naked eyes and, if two phase separation was observed, the combination of such solvent and such aggregating agent was deemed to be incompatible with each other. Also, in the case of a condition of uniform single phase, the sample tube, after having been withdrawn from the high temperature controlled bath, was cooled and the temperature at which the uniform single phase solution started turning unclear was defined as the upper critical solution temperature.

The solvent and the aggregating agent employed in the practice of the present invention preferably do not dissolve with each other at the temperature at which the thermal induced phase separation takes place and, in terms of the process, the combination thereof, which has the upper critical solution temperature higher than 30° C., and preferably does not dissolve with each other higher than 0° C. and more preferably in any temperature region thereof, is selected. In the general membrane forming technique, since it becomes difficult to manufacture the uniform porous membrane, there is a tendency that the stock solution tending to exhibit a characteristic coinciding with the characteristic (2) discussed previously is not selected. However, in the practice of the present invention, the solution exhibiting the characteristic (2) discussed previously can be selected by employing the inorganic particles exhibiting the characteristic discussed previously.

When the combination of the solvent and the aggregating agent, which has such characteristic (2) as discussed previously is employed, the porous membrane having both of a high separating performance and a high permeating performance can be easily and inexpensively manufactured. As a method of manufacturing the porous membranes having both of the high separating performance and the high permeating, the method has been shown, in which the combination of the solvent and the vinylidene fluoride resin capable of developing the liquid-liquid type thermal induced phase separation (See, for example, the Patent Document 3 quoted above.), but the region of the liquid-liquid phase separation is generally so narrow that the control is difficult to achieve. Also, it is extremely important to select a proper combination capable of developing the liquid-liquid phase separation and this is not easy. On the other hand, the solvent employed in the practice of the present invention, if capable of exhibiting the characteristic (2) discussed previously in combination with the aggregating agent, may be any kind capable of developing either the liquid-liquid phase separation or the solid-liquid phase separation in cooperation with the vinylidene fluoride resin. In the membrane making method of the present invention, even when the solvent capable of developing the solid-liquid phase separation, the porous membrane having separating and permeating performances both comparable with or higher than those exhibited by the porous membrane which has been manufactured by the conventional membrane making method utilizing the liquid-liquid phase separation. Accordingly, the range of selection of components forming the stock solution for the manufacture of the porous membrane expands, making it possible to facilitate the manufacture of the porous membrane excellent in separating and permeating performances. More specifically, the combination of the solvent and the aggregating agent, which may be employed in the practice of the present invention, include a combination of benzyl benzoate (non-aqueous solvent) and ethylene glycol (water soluble), a combination of γ-butyrolactone (water soluble) and glycerin (water soluble) and a combination of ε-caprolactone (water soluble) and glycerin (water soluble). Of them, in the practice of the present invention, the use of the combination of the water soluble solvent and the water soluble aggregating agent is preferred.

The composition of the stock solution for the manufacture of the porous membrane, which includes the vinylidene fluoride resin, solvent, inorganic particles and aggregating agent, all of which have been described above, may be suitably selected as desired, provided that the porous membrane so manufactured can have a practically acceptable strength and also have a desired pore size and that the continuity of the pores open from one surface of the porous membrane to the opposite surface thereof exists to such an extent as to satisfy a desired performance. Although the composition of the stock solution for the manufacture of the porous membrane may vary depending on the chemical structure of each of the components referred to above, it is preferred that the vinylidene fluoride resin: the solvent: the inorganic particles: the aggregating agent=20 to 40: 25 to 60: 10 to 30: 20 to 50, provided that the total of the composition ratios of the vinylidene fluoride resin, the solvent, the inorganic particles and the aggregating agent is assumed to be 130 (the same assumption applies to the subsequent description). If the composition of the stock solution for the manufacture of the porous membrane departs from this range, the stability at the time of spinning the stock solution for the manufacture of the porous membrane is lowered, making it difficult to spin the uniform hollow fibers and, also, if the amount of the vinylidene fluoride resin used is larger than the amount described above, there is a tendency that the permeating characteristic and the fractionating characteristic of the hollow fibers eventually obtained will be badly proportionated to each other even though the uniform hollow fibers can be spun.

The stock solution for the manufacture of the porous membrane, of the composition including the vinylidene fluoride resin, the solvent, the inorganic particles and the aggregating agent as hereinabove described, may, if required, be added with various additives, including an antioxidant, a VU absorbent, a lubricant, an antiblocking agent and pigments or dyes, provided that they do not ruin the object of the present invention.

The stock solution for the manufacture of the porous membrane, of the composition including the vinylidene fluoride resin, the solvent, the inorganic particles and the aggregating agent as hereinabove described, are kneaded in a two-axle blending equipment, plastmil or a mixer. The kneading temperature is chosen to be of a value at which the vinylidene fluoride resin and the solvent can be dissolved and any of the various components of the above described mixture will not decompose. After the stock solution for the manufacture of the porous membrane has been kneaded, bubbles are sufficiently removed and weighed by the use of a weighing pump such as, for example, a gear pump. After having been weighed, the stock solution for the manufacture of the porous membrane is extruded through a sheet die or a nozzle of a double ring structure to form a desired shape. Where it is desired to form hollow fibers, a gaseous medium such as, for example, air or nitrogen, or a liquid having a boiling point higher than the temperature, at which the stock solution for the membrane manufacture is extruded, is simultaneously extruded from a center portion of the nozzle of the double ring structure. The liquid that may be used when being extruded from the center portion of the nozzle of the double ring structure is preferably employed in the form of a non-solvent or a poor solvent that is not soluble or poorly soluble with the vinylidene fluoride resin. By way of example, polyvalent alcohol such as, for example, tetraethylene glycol, propylene glycol or glycerin may be enumerated therefor. By so selecting, the thermal induced phase separation of an inner surface of the hollow fiber obtained proceeds and, therefore, the structure in the outermost surface can be made coarse to thereby provide a large pore size effectively. The pores so made coarse are extremely important in forming the slit shaped micropores on the surface, of which the average ratio between the major axis and the minor axis is not smaller than 5:1.

The extrusion molded article extruded through the sheet die or nozzle is accompanied by phase separation of the vinylidene fluoride resin and the solvent as a result of change in temperature induced by, for example, cooling, with the vinylidene fluoride resin being solidified subsequently. When the mixture of the vinylidene fluoride resin with the solvent compatible with such vinylidene fluoride resin solidifies in contact with inside of the poor solvent of the vinylidene fluoride resin, a portion corresponding to the interface between the above described mixture and the non-solvent forms a dense layer and the resultant porous membrane will have an uneven structure, resulting in the possibility that no high separating precision can be obtained. The cooling method includes cooling within an air medium, introducing into a liquid, and introducing into a liquid after having once been passed through an air medium and any one of those methods may be employed, but it is preferred that the atmospheric temperature be controlled with a hot air and/or the temperature of the liquid used for cooling be controlled so that, since the cooling rate affects the strength and elongation of the porous membrane and, also, the pore size control, the cooling rate can be controlled. For the liquid used for cooling, water and organic liquid may be enumerated. The liquid may be a cooling liquid containing a plurality of components in which at least one or more components are dissolved. Considering the environmental aspect and the aspect of manufacturing cost, the use of water is preferable. It is to be noted that where the use is made of a water soluble solvent and water is used in a cooling bath, a mixed liquid, in which at least one or more of salts is/are dissolved or which contain a plurality of salts, may be employed advantageously. When a brine solution is employed during the coagulating step, it is possible to lower the rate of exchange between the water (non-solvent) and the water soluble solvent, making it possible to form the porous membrane in which formation of the dense layer in the membrane surface resulting from an abrupt fixing of the structure is suppressed. The higher the salt concentration, the lower the rate of exchange between the water and the water soluble solvent, resulting in formation of the porous membrane in which formation of the dense layer in the membrane surface resulting from an abrupt fixing of the structure is suppressed. The term "salt" referred to herein is a monovalent or multivalent compound such as, for example, halogenide, hydrosulfate, nitrate, chlorate, lactate or acetate and may be employed in the form of either an hydrous salt or salt hydrate. For example, salts such as sodium sulfate and potassium sulfate may be enumerated.

Then, inclusion of a step of drawing the porous membrane from the molded article so formed as hereinabove described, before the solvent, the inorganic particles and the aggregating agent have been extracted completely, is characterized. When the porous membrane is drawn before the completion of the extraction, it is expected that the porous membrane finally manufactured can have a high permeability. The drawing is preferably carried out at a temperature within the range of 0 to 160° C. Where the temperature is higher than 160° C., it is not desirable because the drawing spots are considerable and, also, the degree of elongation at breakage and the water permeability are lowered, and where the temperature is lower than 0° C., it is difficult to draw stably and uniformly, and only structurally fragile portions break. When the drawing is made at a drawing factor of 1.1 to 4, preferably 1.1 to 3.5 and more preferably 1.1 to 3 at a temperature preferably within the range of 30 to 120° C. and, more preferably, within the range of 30 to 100° C., the intended porous membrane can be obtained. The drawing factor referred to above stands for a magnification determined from the length of the porous membrane when the latter is most drawn during the drawing step. Also, although performance of the drawing in a liquid is desirable because the temperature can be easily controlled, it may be performed in a gaseous medium such as, for example, steam. For the liquid, water is preferably employed because it can be convenient, and the use of polyethylene glycol of a low molecular weight or the like can be advantageously employed where the drawing is performed at a temperature higher than 95° C. Also, drawing in a mixed liquid containing a plurality of liquid mediums, such as a mixed liquid containing water and polyethylene glycol may be employed. In the present invention, it is preferable to draw the porous membrane containing the solvent and the aggregating agent. The porous membrane containing the solvent and the aggregating agent is less susceptible to breakage during the drawing as compared with that of the porous membrane containing neither the solvent nor the aggregating agent. Also, it is preferable to draw the porous membrane containing the inorganic particles. In the porous membrane containing the inorganic particles, the continuity in the membrane section can be enhanced as the closed pores present in the membrane section split at the inorganic particles and then transform into continuous pores. Also, it is possible to change the coarse pores present on one surface of the porous membrane into the slit shaped micropores and, hence, the permeating performance of the porous membrane can be increased significantly. In the practice of the present invention, it is preferable to draw the porous membrane containing the solvent, the inorganic particles and the aggregating agent. In addition, a method of extracting the porous membrane which has been drawn is advantageous in that since voids have increased in the surface and inside of the porous membrane as a result of the drawing, an extracted solvent is easy to permeate into the porous membrane.

Thereafter, from the molded article so formed as hereinabove described, the porous membrane is obtained by extracting the solvent, the inorganic particles and the aggregating agent. The extraction of those components may be performed continuously during a process step together with the operation to extrude and solidify, or may be performed subsequent to winding of the molded article once around a frame or a skein, or after the molded article has been accommodated within a casing of a predetermined configuration and then modularized. The solvent used to extract each of the component used must be a non-solvent of the vinylidene fluoride resin at the extracting temperature. Although the extracting solvent may differ depending on the chemical structure or the like of the components to be extracted, acetone or methanol may be employed in the case of the solvent being, for example, a non-aqueous solvent and a water soluble solvent may be employed in the case of the solvent being water. Also, in the case of the inorganic particles being silica, extraction with the use of an alkaline solution is suitably employed. In addition, in the case of the aggregating agent being poorly water soluble, hexane, acetone or methanol may be enumerated and in the case of the aggregating agent being water soluble, water may be enumerated. The porous membrane is, after those processes have been worked thereon, dried in a condition as wound around the frame or skein.

Also, the porous membrane of the present invention may be suitably heat treated. The heat treatment is for the purpose of increasing the proportion of an α type crystalline structure of the porous membrane made of the vinylidene fluoride resin. As a result that the inventors of the present invention have examined the chemical resistance of the porous membrane made of the vinylidene fluoride resin, the inventors have found that not only the crystallinity index but also the crystalline structure contributes to the chemical resistance. Further intensive examination has reviewed that the chemical resistance increases when the α type crystalline structure is present at a rate higher than that of the β type crystalline structure. Increase of the chemical resistance when the α type crystalline structure is present at a rate higher than that of the β type crystalline structure appears to have resulted from the following reason. As compared with the β type crystalline structure, the α type crystalline structure contains hydrogen atoms and fluorine atoms being delocalized and, accordingly, it appears that is why depolarization of electric charges is scarce. In other words, since the proportion of the α type crystalline structure, which is non polar, is higher than that of β type crystalline structure, in which hydrogen atoms and fluorine atoms are delocalized and intermolecular polarization occurs, it appears that the porous membrane made of the polyvinylidene fluoride in accordance with the present invention has an excellent chemical resistance. In view of this, the porous membrane of the present invention is preferably heat treated in a free condition, i.e., in a condition in which the porous membrane is not fixed. By way of example, it is possible to perform the heat treatment on the porous membrane simultaneously with extraction of the solvent and aggregating agent, if the porous membrane is, after the drawing process, wound temporarily onto the frame or skein and is subsequently held in the free condition. If the heat treatment is performed while the porous membrane is held in a fixed condition, thermal shrinkage takes place accompanied by strains, which lead to change in the crystalline structure in the microscopic environment. More specifically, transform from the α type crystalline structure to the β type crystalline structure occurs, the proportion of the β type crystalline structure in the porous membrane increases and, therefore, it may occur that the desired effects can no longer be obtained.

Figure 6:
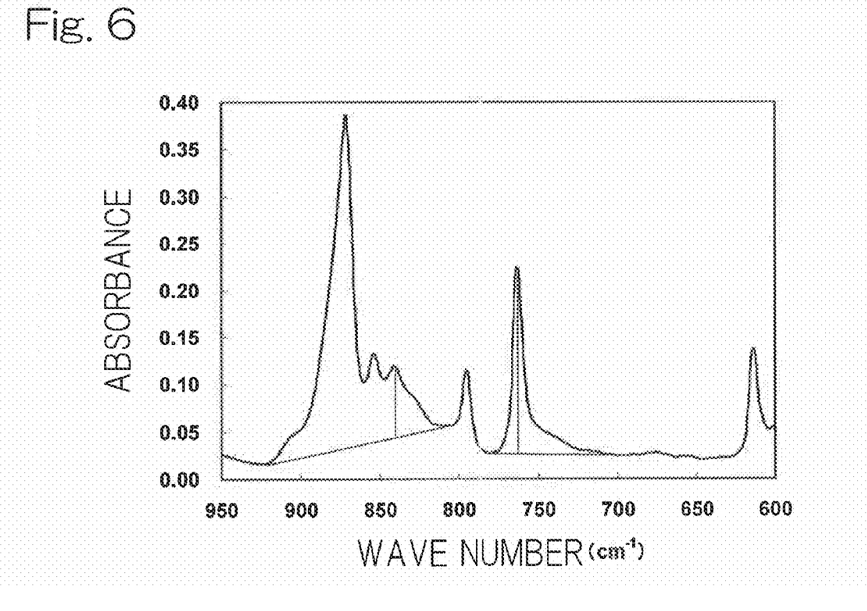
FIG. 6 is an IR chart of a hollow fiber membrane manufactured in accordance with a method in Example 1.

Measurement of the proportion of the crystalline structure in the porous membrane made of polyvinylidene fluoride in accordance with the present invention is carried out by the following manner. It is represented by a value of $R_1$ calculated by the following equation (1) using the absorbance ($A_{763}$) of 763 cm$^{-1}$ and the absorbance ($A_{840}$) of 840 cm$^{-1}$, both obtained by the IR measurement.

$$R_1 = A_{763}/A_{840} \quad (1)$$

where $A_{763}$ represents the absorbance attributable to the α type crystalline structure and $A_{840}$ represents the absorbance attributable to the β type crystalline structure. (See, for example, the Patent Document 5 quoted above.) The value of $R_1$ is indicative of the proportion of the α type and β type within a crystalline region of the polyvinylidene fluoride. From the IR chart of the porous membrane shown in FIG. 6, a line is drawn between respective minimal values in the IR chart in the vicinity of 763 cm$^{-1}$ and 780 cm$^{-1}$ and, then, the height of the characteristic absorption peak attributable to the α type crystalline structure in the vanity of 763 cm$^{-1}$ is read out. Along therewith, a line is drawn between respective minimal values in the IR chart in the vicinity of 810 cm$^{-1}$ and 925 cm$^{-1}$ and, then the characteristic absorption peak attributable to the β type crystalline structure in the vanity of 840 cm$^{-1}$ is read out, resulting in the $R_1$. The $R_1$ in the present invention is preferably equal to or higher than 1.5.

The α type crystalline structure of the polyvinylidene fluoride resin is characterized in that hydrogen atoms (or fluorine atoms) bond to a carbon atom neighboring to one side of a backbone carbon contained in the polymer molecule lie at a position of trance relative to fluorine atoms (or hydrogen atoms) bond to the backbone carbon while hydrogen atoms (or fluorine atoms) bond to a carbon atom neighboring to the other side of the backbone carbon lie at a position of Ghosh (60° position) relative to fluorine atoms (or hydrogen atoms) bond to the backbone carbon and two or more steric structures thereof are continued to each other; the molecular chain is a TG$^+$TG$^-$ type and the dipole moment of the C—F$_2$ bond and the C—H$_2$ bond has respective components in vertical and parallel directions relative to the molecular chain. When the IR analysis is conducted on the polyvinylidene fluoride resin having the α type crystalline structure, characteristic peaks (characteristic absorptions) appear in the vicinity of 1212 cm$^{-1}$, 1183 cm$^{-1}$ and 763 cm$^{-1}$, respectively, and, in the powdery X-ray diffraction analysis, characteristic peaks appear at 2θ=17.7°, 18.3° and 19.9°, respectively.

The β type crystalline structure of the polyvinylidene fluoride resin is characterized in that hydrogen atoms and fluorine atoms bond to carbon atoms neighboring to one backbone carbon contained in the polymer molecule lie in respective steric orientations (TT type structure) of trance, that is, the hydrogen atoms and the fluorine atoms bond to the neighboring carbon atoms lie at a position of 180° as viewed from a direction of the carbon-carbon bond. The carbon-carbon bond in which a portion forming the TT type structure forms the backbone chain of the TT type has a plane zigzag structure and the dipole moment of C—F$_2$ bond and C—H$_2$ bond has a component in a vertical direction relative to the molecule chain. When the IR analysis is conducted on the β type crystalline structure, characteristic peaks (characteristic absorptions) appear in the vicinity of 1274 cm$^{-1}$, 1163 cm$^{-1}$ and 840 cm$^{-1}$, respectively, and, in the powdery X-ray diffraction analysis, a characteristic peak appears at 2θ=21°, respectively.

As a procedure to perform the heat treatment, it may be carried out after the formation of the membrane and before the extracted components are removed by cleansing or after they have been removed. Also, it may be carried out in a condition of the membrane, in which filaments are bundled and have been subjected to the drying step, or the heat treatment may alternatively be carried out after the membrane has been modularized. It is to be noted that where the heat treatment is carried out after the modularization, allowance should be taken into consideration in anticipation of a possible shrinkage, which may take place as a result of the heat treatment, so as to avoid the membrane being stretched.

As a method of heat treatment, a drying method with hot air, a wet method of immersing in liquid, a method in which the porous membrane is contacted with metallic rolls that are heated and modulated, a method in which it is carried out with a gaseous medium such as, for example, steam and a method in which electromagnetic waves are emitted may be enumerated and they can be performed even when the porous membrane is either in a wet condition or in a dried condition. Of them, the method of immersing in water is convenient in view of easiness of the temperature control. The use of a non-solvent of the polyvinylidene fluoride resin such as, for example, polyethylene glycol of a low molecular weight may be preferably employed. It may also be employed to perform the heat treatment in a mixed liquid containing a plurality of components such as, for example, a mixed liquid containing water and polyethylene glycol or a surface active agent solution.

Depending on selection of immersing liquid in the wet system, extracting and removal of the extracted components in the membrane forming stock solution and the heat treatment can be carried out simultaneously.

The heat treating temperature is preferably carried out within the range of 70° C. to 160° C. in view of the fact that effects of heat treatment can be obtained and the required characteristics of the porous membrane other than the chemical strength will not be impaired.

The heat treating time is not specifically limited to a particular value, but the range of 1 to 5 hours is preferable in terms of the productivity. Selection of a high heat treating temperature makes it possible to shorten the heat treating time.

After the heat treatment, it is preferably allowed to stand at room temperatures to thereby cool slowly.

The porous membrane made of the vinylidene fluoride resin as hereinabove described is used as a membrane module accommodated within a casing provided with a stock solution intake port and a permeate outflow port. The membrane module, where the membrane is a hollow fiber membrane, includes a multiplicity of hollow fibers bundled together and then accommodated within a cylindrical container with opposite ends or one ends thereof so fixed with polyurethane or an epoxy resin that a permeate can be recovered, or fixed in a flat plate-like configuration so that the permeate can be recovered. Where the membrane is a flat membrane, the flat membrane is spirally wound around a liquid collecting tube while being folded in a fashion similar to a postal envelope and then accommodated into a cylindrical container so that the permeate can be recovered, or the flat membrane is arranged on opposite surfaces of a liquid collecting tube with its periphery tightly fixed so that the permeate can be recovered.

And, the membrane module is provided with at least one of a pressurizing apparatus on the side of raw liquid and a suction apparatus on the side of the permeate and is then used as a separating device for separating water or the like. For the pressurizing apparatus, a pump may be employed or the pressure derived from the difference in water level may be employed. Also, it is possible to use a pump or siphon for the suction apparatus.

This separating device may be employed in water purifying treatment, purification of water, wastewater treatment and manufacture of industrial water so far as the field of water treatment is concerned, and river water, lake water, underground water, sea water, sewage and/or sewage water are used as liquid to be treated.

Also, the porous membrane made of the vinylidene fluoride resin as described above can be used for a battery separator for separating positive and negative poles from each other within a battery and, in such case, it can be expected that the performance of the resultant battery be increased due to a high ion permeability and the durability of the resultant battery can be increased due to a high breakage strength.

In addition, the porous membrane made of the vinylidene fluoride resin manufactured in accordance with the above described method, when used as a charged membrane with charge group (ion exchange group) introduced, can be expected to exhibit an effect of increasing the ion recognition and/or increasing the durability of the charged membrane due to a high breakage strength.

Yet, when the porous membrane made of the vinylidene fluoride resin is impregnated with an ion exchange resin and is then used in a fuel cell as an ion exchange membrane, and particularly when methanol is used for a fuel, expansion which would result from the methanol in the ion exchange membrane can be suppressed and, therefore, increase of the performance of the fuel cell can be expected. Also, due to a high breakage strength, increase of the durability of the fuel cell can be expected.

Hereinafter, the present invention will be demonstrated by way of illustrative examples, which should not be construed as specifically limiting the scope of the present invention.

EXAMPLE 1

Polyvinylidene fluoride (hereinafter, occasionally abbreviated "PVDF". Available as "SOLEF6010" manufactured by and available from Solvay Solexis Kabushiki Kaisha) as a vinylidene fluoride resin, γ-butyrolactone as a solvent, silica ("Fine Seal X-45" manufactured by and available from Kabushiki Kaisha Tokuyama) as inorganic particles, and glycerin (refined glycerin manufactured by and available from Kao Kabushiki Kaisha) were mixed in a mixing ratio by weight of 36:47:18:19 to provide a membrane forming stock solution. The composition of this membrane forming stock solution is shown in Table 1. The upper critical solution temperature of γ-butyrolactone and glycerin both contained in the composition ratio was 40.6° C.

The membrane forming stock solution so prepared as hereinabove described was chipped by passing a strand, which was heated and kneaded (at a temperature of 150° C.) within a two-axle blending and extruding equipment and then extruded therefrom, through a pelletizing machine. The resultant chips were extruded with the use of an extruder (150° C.) equipped with a nozzle of a double ring configuration having an outer diameter of 1.6 mm and an inner diameter of 0.8 mm. At this time, tetraethylene glycol was injected into a hollow of the resultant extruded material.

An extruded and molded article extruded from spinnerets into an air medium was introduced into a water bath (at a temperature of 60° C.), containing an aqueous solution of 20 wt % sodium sulfate, after having been airborne a distance of 3 cm, and was then passed a distance of about 100 cm through the water bath to cool and solidify. Subsequently, while the solvent, aggregating agent and most of the inorganic particles remained in a hollow fiber article, it was drawn in a hot water of 90° C. in a direction of fibers so as to have the length, which is about 1.5 times the original length, and, then, the resultant hollow fiber article was heat treated for 180 minutes within a running water of 95° C. and, at the same time, the solvent (γ-butyrolactone), the aggregating agent (glycerin) and the injected liquid (tetraethylene glycol) were removed by extraction.

The hollow fiber article so obtained was immersed for 120 minutes within an aqueous solution, containing 5 wt % sodium hydrate and heated to 40° C., to extract and remove the inorganic particles (silica), followed by a flushing or washing process to provide the hollow fiber membrane. Results of tests conducted on the hollow fiber membrane so manufactured are shown in Table 2. The value of $R_1$ measured by the IR measurement of the hollow fiber membrane so manufactured was found to be 2.5.

To evaluate the resistance of the manufactured hollow fiber membrane to the oxidizing reagent, it was immersed within an aqueous solution of sodium hypochlorite (5000 ppm in effective chlorine concentration) for 7 days at 60° C. and the physical characteristic (tension breaking strength) thereof was then measured, the result of which is shown in Table 3.

Methods and apparatus for the various measurements (analyses):
(1) Particle Cutoff:

The stopping ratio of at least two kinds of particles having different particle sizes is measured to provide a measured value, which is in turn used in the following approximation (1), as will be described later, to determine the value of S at which R becomes 90, such value of S being descriptive of the fractionated particle size.

$$R=100/[1-m\times\exp(-a\times\log(S))] \quad (1)$$

where "a" and "m" represent respective constants determined by the hollow fiber membrane and can be calculated based on the measured value of the stopping ratio of the two kinds or more. It is, however, to be noted that the fractionated particle size in the case where the stopping ratio of the particles of 0.1 μm in size is equal to or larger than 90%, it is expressed by <0.1 μm.

(2) Pure Water Permeating Rate:

Using the hollow fiber membrane module of an open ended type having an effective length of 3 cm and pure water as a raw water, filtration (external pressure filtration) from outside to inside of the hollow fiber membrane is carried out under a condition, in which the filtration pressure is 50 kPa and the temperature is 25° C., to measure the amount of water filtered per unitary time, and the permeating rate was calculated in terms of the value converted into the amount of water per unitary membrane surface area, unitary time and unitary pressure.

EXAMPLE 2

In a manner similar to Example 1 above except that ε-caprolactone was used as a solvent, the hollow fiber membrane was obtained. The upper critical solution temperature of ε-caprolactone and glycerin both contained in the above described composition ratio was 47.3° C. Results of examination of the hollow fiber membrane so manufactured are shown in Table 2.
Comparison 1:

Except that polyvinylidene fluoride (hereinafter, occasionally abbreviated "PVDF") ("SOLEF6010" manufactured by and available from Solvay Solexis Kabushiki Kaisha), γ-butyrolactone, silica as inorganic particles, and polyoxyethylene nonyl phenyl ether ("NP-5" manufactured by and available from Nikko Chemicals Kabushiki Kaisha) were mixed in a mixing ratio by weight of 36:47:18:19 to provide a membrane forming stock solution, the hollow fiber membrane was obtained in a manner similar to Example 1. In the γ-butyrolactone and polyoxyethylene nonyl phenyl ether contained in the composition ratio, no upper critical solution temperature was observed and they were compatible with each other at any temperature. Results of examination of the manufactured hollow fiber membrane are shown in Table 2.

EXAMPLE 3

Polyvinylidene fluoride (hereinafter, occasionally abbreviated "PVDF") ("SOLEF6010" manufactured by and available from Solvay Solexis Kabushiki Kaisha), γ-butyrolactone as a solvent, silica ("Fine Seal X-80" manufactured by and available from Kabushiki Kaisha Tokuyama) as inorganic particles, glycerin (refined glycerin manufactured by and available from Kao Kabushiki Kaisha) and polyvinyl pyrrolidone ("K-90" manufactured by and available from BASF Corporation) as a hydrophilic resin were mixed in a mixing ratio by weight of 35:43:19:20:3 to provide a membrane forming stock solution. The composition of this membrane forming stock solution is shown in Table 1. The upper critical solution temperature of γ-butyrolactone and glycerin both contained in the composition ratio was 41.6° C.

The membrane forming stock solution so prepared as hereinabove described was chipped by passing a strand, which was heated and kneaded (at a temperature of 150° C.) within a two-axle blending and extruding equipment and then extruded therefrom, through a pelletizing machine. The resultant chips were extruded with the use of an extruder (150° C.) equipped with a nozzle of a double ring configuration having an outer diameter of 1.6 mm and an inner diameter of 0.8 mm. At this time, tetraethylene glycol was injected into a hollow of the resultant extruded material.

An extruded and molded article extruded from spinnerets into an air medium was introduced into a water bath (at a temperature of 30° C.), containing an aqueous solution of 10 wt % sodium sulfate, after having been airborne a distance of 3 cm, and was then passed a distance of about 100 cm through the water bath to cool and solidify. Subsequently, while the solvent, aggregating agent and most of the inorganic particles remained in a hollow fiber article, it was drawn in a hot water of 90° C. in a direction of fibers sp as to have the length, which is about 1.8 times the original length, and, then, the resultant hollow fiber article was heat treated for 180 minutes within a running water of 95° C. and, at the same time, the solvent (γ-butyrolactone), the aggregating agent (glycerin) and the injected liquid (tetraethylene glycol) were removed by extraction.

The hollow fiber article so obtained was immersed for 120 minutes within an aqueous solution, containing 5 wt % sodium hydrate and heated to 40° C., to extract and remove the inorganic particles (silica), followed by a flushing or washing process to provide the hollow fiber membrane.

Thereafter, after the resultant hollow article so obtained had been immersed into an aqueous solution (30° C.) containing 5 wt % peroxodisulfate for 30 minutes, the resultant hollow article was removed from the aqueous solution, followed by removal of an excessive solution deposited on the hollow article and, then put into a reaction vessel. A steam of about 120° C. was blown into the reaction vessel and the heat treatment was carried out for 30 minutes while the interior of the vessel was kept at a temperature equal to or higher than 90° C. The hollow article thus heat treated was washed for 30 minutes in with hot water of 90° C., leaving the hollow fiber membrane. Results of tests conducted on the resultant hollow fiber membrane are shown in Table 2. Thereafter, the manufactured hollow fiber membrane was dried for 12 hours within an air blowing and drying machine set to 40° C. The retention of the permeating performance before and after the hollow fiber membrane being dried is shown in Table 3. Also, scanning electron micrographs taken on the occasion of observing the membrane structure are shown in FIGS. 1 to 4.

Comparison 2:

Polyvinylidene fluoride (hereinafter, occasionally abbreviated "PVDF") ("SOLEF6010" manufactured by and available from Solvay Solexis Kabushiki Kaisha), hexyl benzoate (Reagent 1st Class, manufactured by and available from Wako Junyaku Kabushiki Kaisha) as a solvent, silica ("Fine Seal X-45" manufactured by and available from Kabushiki Kaisha Tokuyama) as inorganic particles, and hexaglyceryl monolaurate ("Hexaglyn 1-L" manufactured by and available from Nikko Chemicals Kabushiki Kaisha) as an aggregating agent were mixed in a mixing ratio by weight of 20:80:10:10 to provide a membrane forming stock solution. The composition of this membrane forming stock solution is shown in Table 1. In the hexyl benzoate and hexaglyceryl monolaurate contained in the composition ratio, no upper critical solution temperature was observed and they were compatible with each other at any temperature.

The membrane forming stock solution so prepared as hereinabove described was chipped by passing a strand, which was heated and kneaded (at a temperature of 240° C.) within a two-axle blending and extruding equipment and then extruded therefrom, through a pelletizing machine. The resultant chips were extruded with the use of an extruder (230° C.) equipped with a nozzle of a double ring configuration having an outer diameter of 1.6 mm and an inner diameter of 0.8 mm. At this time, tetraethylene glycol was injected into a hollow of the resultant extruded material.

An extruded and molded article extruded from spinnerets into an air medium was introduced into a water bath (at a temperature of 30° C.) after having been airborne a distance of 3 cm, and was then passed a distance of about 100 cm through the water bath to cool and solidify. Subsequently, the resultant hollow fibers were immersed for 60 minutes repeatedly two times in a bath of methanol heated to 50° C. to extract and remove the solvent (hexyl benzoate), aggregating agent (hexaglyceryl monolaurate) and injected liquid (tetraethylene glycol).

Figure 5:
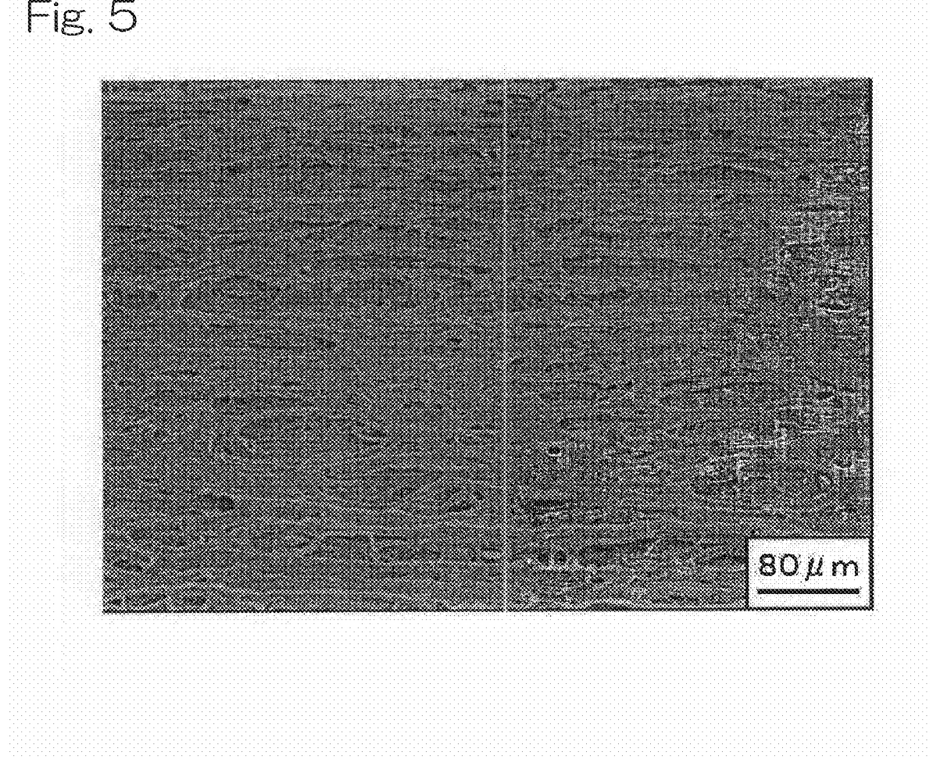
FIG. 5 is a scanning electron micrograph showing an inner surface of a porous membrane of a vinylidene fluoride resin manufactured in accordance with a method in Comparison 2.

The hollow fiber article so obtained was, after having been drawn in a hot water of 80° C. in a direction of fibers so as to have the length, which is about twice the original length, thermally fixed within a hot water of 100° C. and was then immersed in an aqueous solution, containing 5 wt % sodium sulfate and heated to 40° C., for 120 minutes to extract and remove the inorganic particles (silica), leaving the hollow fiber membrane through the flushing step. Results of examination are shown in Table 2. Thereafter, the manufactured hollow fiber membrane was dried for 12 hours within an air blowing and drying machine set to 40° C. The retention of the permeating performance before and after the hollow fiber membrane being dried is shown in Table 3. Also, a scanning electron micrograph taken on the occasion of observing the membrane structure is shown in FIG. 5.

EXAMPLE 4

Polyvinylidene fluoride ("SOLEF6010" manufactured by and available from Solvay Solexis Kabushiki Kaisha), ε-caprolactone as a solvent, hydrophobic silica ("R-972" manufactured by and available from Nippon Aerozil Kabushiki Kaisha) as inorganic particles, and glycerin as an aggregating agent were mixed in a mixing ratio by weight of 36:54:18:12 to provide a mixed solution. The upper critical solution temperature of ε-caprolactone and glycerin both contained in the composition ratio was 35.8° C.

The mixed solution so prepared as hereinabove described was chipped by passing a strand, which was heated and kneaded (at a temperature of 165° C.) within a two-axle blending and extruding equipment and then extruded therefrom, through a pelletizing machine. The resultant chips were extruded with the use of an extruder (150° C.) equipped with a nozzle of a double ring configuration having an outer diameter of 1.6 mm and an inner diameter of 0.8 mm. At this time, tetraethylene glycol was injected into a hollow of the resultant extruded material.

An extruded and molded article extruded from spinnerets into an air medium was introduced into a water bath (at a temperature of 40° C.), containing an aqueous solution of 20 wt % sodium sulfate, after having been airborne a distance of 3 cm, and was then passed a distance of about 100 cm through the water bath to cool and solidify. Subsequently, while the solvent, aggregating agent and most of the inorganic particles remained in the hollow fiber article, it was drawn in a hot water of 90° C. in a direction of fibers so as to have the length, which is about 2.0 times the original length, and, then, the resultant hollow fiber article was heat treated for 180 minutes within a running water of 95° C. and, at the same time, the solvent (γ-butyrolactone), the aggregating agent (glycerin) and the injected liquid (tetraethylene glycol) were removed by extraction.

The hollow fiber article so obtained was immersed for 120 minutes within an aqueous solution, containing 5 wt % sodium hydrate and heated to 40° C., to extract and remove the inorganic particles (silica), followed by a flushing or washing process to provide the hollow fiber membrane. Results of tests conducted on the hollow fiber membrane so manufactured are shown in Table 2.

EXAMPLE 5

Except for that the heat treatment for 120 minutes and the extraction and removal of the solvent, the aggregating agent and the injected liquid were carried out in a running water heated to 95° C., the hollow fiber membrane was obtained in a manner similar to Example 1. The $R_1$ value of the manufactured hollow fiber membrane determined by the IR measurement was found to be 2.1.

To evaluate the resistance of the manufactured hollow fiber membrane to the oxidizing reagent, it was immersed within an aqueous solution of sodium hypochlorite (5000 ppm in effective chlorine concentration) for 7 days at 60° C. and the physical characteristic (tension breaking strength) thereof was then measured, the result of which is shown in Table 3.

EXAMPLE 6

Except for that the heat treatment for 180 minutes and the extraction and removal of the solvent, the aggregating agent and the injected liquid were carried out in a running water heated to 85° C., the hollow fiber membrane was obtained in a manner similar to Example 1. The $R_1$ value of the manufactured hollow fiber membrane determined by the IR measurement was found to be 1.9.

To evaluate the resistance of the manufactured hollow fiber membrane to the oxidizing reagent, it was immersed within an aqueous solution of sodium hypochlorite (5000 ppm in effective chlorine concentration) for 7 days at 60° C. and the physical characteristic (tension breaking strength) thereof was then measured, the result of which is shown in Table 3.

Comparison 3:

Except for that the heat treatment for 180 minutes and the extraction and removal of the solvent, the aggregating agent and the injected liquid were carried out in a running water heated to 45° C., the hollow fiber membrane was obtained in a manner similar to Example 1. The $R_1$ value of the manufactured hollow fiber membrane determined by the IR measurement was found to be 0.9.

To evaluate the resistance of the manufactured hollow fiber membrane to the oxidizing reagent, it was immersed within an aqueous solution of sodium hypochlorite (5000 ppm in effective chlorine concentration) for 7 days at 60° C. and the physical characteristic (tension breaking strength) thereof was then measured, the result of which is shown in Table 3.

TABLE 1

| | Material Resin PVDF | Hydrophilic Resin | Solvent | | | Inorganic Particles Silica | | | Aggregating agent | | |
|---|---|---|---|---|---|---|---|---|---|---|---|
| | SOLEF 6010 | PVP K-90 | γ- | ε- | Hexyl benzoate | X-45 | F-80 | R 972 | Gly | NP-5 | Hexa-glyn 1-L |
| Exm. 1 | 36 | | 47 | | | 18 | | | 19 | | |
| Exm. 2 | 36 | | | 47 | | 18 | | | 19 | | |
| Exm. 3 | 35 | 3 | 43 | | | | 20 | | 19 | | |
| Exm. 4 | 36 | | | 54 | | | | 18 | 12 | | |
| Comp. 1 | 36 | | 47 | | | 18 | | | | 19 | |
| Comp. 2 | 36 | | | | 56.4 | 10.8 | | | | | 16.8 |

In Table 3 above, "γ-" stands for γ-butyrolactone, and "ε-" stands for ε-caprolactone.

TABLE 2

| | Pure Water Permeate Flow L/ (hr·m²·98 kPa) | Particle cutoff (μm) | Pore Major Axis:Pore Minor Axis | |
|---|---|---|---|---|
| | | | Outer Surface | Inner Surface |
| Exm. 1 | 130000 | 3.3 | 3.5:1 | 5.8:1 |
| Exm. 2 | 124000 | 2.8 | 3.4:1 | 5.5:1 |
| Exm. 3 | 90000 | 1.8 | 4.0:1 | 6.1:1 |

TABLE 2-continued

| | Pure Water Permeate Flow L/ (hr·m²·98 kPa) | Particle cutoff (μm) | Pore Major Axis:Pore Minor Axis | |
|---|---|---|---|---|
| | | | Outer Surface | Inner Surface |
| Exm. 4 | 6500 | 0.4 | 3.9:1 | 6.3:1 |
| Comp. 1 | 5000 | 0.4 | 3.4:1 | 4.4:1 |
| Comp. 2 | 60000 | 2.0 | 2.7:1 | 3.6:1 |

TABLE 3

| | $R_1$ | Retention of Tension breaking strength (%) |
|---|---|---|
| Exm. 1 | 2.5 | 98 |
| Exm. 5 | 2.1 | 98 |
| Exm. 6 | 1.9 | 96 |
| Comp. 3 | 0.9 | 72 |

TABLE 4

| | Retention of Pure Water Permeate Flow (%) |
|---|---|
| Exm. 3 | 100 |
| Comp. 2 | 13 |

What is claimed is:

1. A porous membrane made of a vinylidene fluoride resin of a particle cutoff not smaller than 0.2 μm, including a first surface and a second surface opposite to each other, the first surface having micropores of a round or oval shape of average ratio, between the major axis and the minor axis, within the range of 1:1 to 5:1 and the second surface having micropores of substantially slit shape of average ratio, between the major axis and the minor axis, not smaller than 5:1, wherein the porous membrane is made of a blended polymer including the vinylidene fluoride resin in a quantity within the range of 90 to 99 wt % and a hydrophilic resin in a quantity within the range of 1 to 10 wt %.

2. The porous membrane made of the vinylidene flouride resin as claimed in claim 1, wherein the hydrophilic resin is a vinylpyrrolidone resin.

3. The porous membrane made of the vinylidene fluoride resin as claimed in claim 1, which is a hollow fiber membrane.

4. The porous membrane made of the vinylidene fluoride resin as claimed in claim 3, wherein the first surface having the micropores of round or oval shape of average ratio, between the major axis and the minor axis, within the range of 1:1 to 5:1 is an outer surface of the hollow fiber membrane and the second surface having micropores of substantially slit shape of average ratio, between the major axis and the minor axis, not smaller than 5:1 is an inner surface of the hollow fiber membrane.

5. The porous membrane made of the vinylidene fluoride resin as claimed in claim 1, which has a void ratio of 50 to 95%.

6. The porous membrane made of the vinylidene fluoride resin as claimed in claim 5 wherein the void ratio is 70 to 90%.

7. A method of preparing a porous membrane made of a blended polymer including a vinylidene fluoride resin and a hydrophilic resin, which comprises:

preparing stock solution containing a vinylidene fluoride resin, a hydrophilic resin, a solvent, inorganic particles and an aggregating agent, in which the inorganic particles and the aggregating agent have an affinity and the solvent and the aggregating agent are not compatible to each other or have an upper critical solution temperature;

cooling the stock solution in a cooling liquid to induce a phase separation to thereby solidify the solution forming a porous membrane; and drawing the porous membrane before the solvent, the inorganic particles and the aggregating agent are extracted completely by the cooling liquid, wherein the blended polymer including the vinylidene fluoride resin in a quantity within the range of 90 to 99 wt % and the hydrophilic resin in a quantity within the range of 1 to 10 wt %.

8. The method of preparing the porous membrane made of the vinylidene fluoride resin as claimed in claim 7, wherein the solvent is a water soluble solvent.

9. The method of preparing the porous membrane made of the vinylidene fluoride resin as claimed in claim 8, wherein the water soluble solvent is γ-butyrolactone or ε-caprolactone.

10. The method of preparing the porous membrane made of the vinylidene fluoride resin as claimed in claim 7, wherein the hydrophilic resin is a vinyl pyrrolidone resin.

11. The method of preparing the porous membrane made of the vinylidene fluoride resin as claimed in claim 7, wherein the porous membrane is a hollow fiber membrane.

12. The method of preparing the porous membrane made of the vinylidene fluoride resin as claimed in claim 11, wherein a first surface having micropores of round or oval shape of average ratio, between the major axis and the minor axis, within a range of 1:1 to 5:1 is an outer surface of the hollow fiber membrane and a second surface having micropores of substantially slit shape of average ratio, between the major axis and the minor axis, not smaller than 5:1 is an inner surface of the hollow fiber membrane.

13. The method of preparing the porous membrane made of the vinylidene fluoride resin as claimed in claim 7, wherein the drawing is carried out at a temperature within the range of 0 to 160° C.

14. The method of preparing the porous membrane made of the vinylidene fluoride resin as claimed in claim 7, wherein the drawing is made at a drawing fractor of 1.1 to 4.

15. The method of preparing the porous membrane made of the vinylidene fluoride resin as claimed in claim 7, wherein the drawing is in a liquid.

* * * * *